US008861398B2

(12) United States Patent  (10) Patent No.: US 8,861,398 B2
Bhatti et al.  (45) Date of Patent: Oct. 14, 2014

(54) METHOD FOR DISCOVERING MULTIPLE ROUTES IN SENSOR NETWORKS

(75) Inventors: Ghulam M Bhatti, Mansfield, MA (US); Jianlin Guo, Newton, MA (US); Jinyun Zhang, Cambridge, MA (US); Koon Hoo Teo, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 721 days.

(21) Appl. No.: 13/077,327

(22) Filed: Mar. 31, 2011

(65) Prior Publication Data

US 2011/0176416 A1  Jul. 21, 2011

(51) Int. Cl.
 *H04L 12/28* (2006.01)

(52) U.S. Cl.
 USPC .......................................................... 370/254

(58) Field of Classification Search
 USPC ........... 370/254, 255, 351, 373, 37, 384, 389, 370/392, 410, 426, 496, 522; 709/220–222
 See application file for complete search history.

(56) References Cited

U.S. PATENT DOCUMENTS

| | | | |
|---|---|---|---|
| 6,961,310 B2 * | 11/2005 | Cain | 370/238 |
| 7,330,694 B2 * | 2/2008 | Lee et al. | 455/7 |
| 7,570,628 B2 * | 8/2009 | Rangarajan et al. | 370/351 |
| 7,924,796 B2 * | 4/2011 | Vu Duong et al. | 370/338 |
| 7,961,626 B2 * | 6/2011 | Reeve | 370/238 |
| 8,064,416 B2 * | 11/2011 | Liu | 370/338 |
| 2003/0202476 A1 * | 10/2003 | Billhartz et al. | 370/236 |
| 2003/0231585 A1 * | 12/2003 | Motegi et al. | 370/229 |
| 2005/0041591 A1 * | 2/2005 | Duggi et al. | 370/238 |
| 2005/0063312 A1 * | 3/2005 | Liu | 370/248 |
| 2005/0129000 A1 * | 6/2005 | Sivakumar et al. | 370/351 |
| 2005/0185632 A1 * | 8/2005 | Draves et al. | 370/351 |
| 2006/0291496 A1 * | 12/2006 | Zheng et al. | 370/432 |
| 2007/0147255 A1 * | 6/2007 | Oyman | 370/238 |
| 2007/0263628 A1 * | 11/2007 | Axelsson et al. | 370/392 |
| 2008/0107034 A1 * | 5/2008 | Jetcheva et al. | 370/238 |
| 2008/0130664 A1 * | 6/2008 | Lee et al. | 370/401 |
| 2008/0186984 A1 * | 8/2008 | Nakano | 370/400 |
| 2010/0146151 A1 * | 6/2010 | Jeong et al. | 709/242 |
| 2010/0195535 A1 * | 8/2010 | Ziller et al. | 370/254 |
| 2011/0019686 A1 * | 1/2011 | Seok et al. | 370/428 |
| 2011/0128918 A1 * | 6/2011 | Zhai | 370/328 |
| 2011/0255479 A1 * | 10/2011 | Liu | 370/328 |

* cited by examiner

*Primary Examiner* — Warner Wong
(74) *Attorney, Agent, or Firm* — Dirk Brinkman; Gene Vinokur

(57) ABSTRACT

Multiple routes from a data source node to multiple data destination nodes in a large scale multi-hop mesh network are discovered. Nodes discover multiple routes to two destinations in an initial discovery phase that includes only two network-wide flooding of packets. The method can also work with one destination. The method can be extended to include more destinations with a proportional increase in the communication overhead. After the completion of the discovery phase, nodes can communicate or forward their own or received data by using any of the available routes.

20 Claims, 4 Drawing Sheets

200

300

METHOD FOR DISCOVERING MULTIPLE ROUTES IN SENSOR NETWORKS

FIELD OF THE INVENTION

This invention relates generally to routing of packets in wireless sensor networks, and particularly to routing in a smart meter network.

BACKGROUND OF THE INVENTION

With rapid advances in wireless networking technologies, it is becoming increasingly feasible to deploy wireless multi-hop mesh networks, including distribution networks of utilities such as electricity, water, and gas, for real-time monitoring, reliability, and better resource management.

The emergence of smart grids offers a formidable challenge in deploying a distributed network of renewable power generation sources and then managing a distribution network for smooth, reliable, and optimized energy management over large geographic areas. A crucial component needed for the successful operation of the overall grid is to collect real-time data on resource consumption in different geographic areas.

A smart meter network typically includes a set of data sources in the form smart meters, and one or more data sinks, connected wirelessly, or through a wired network, such as power line communications (PLC) system. The smart meter acts as communication routers to relay source data, as well as data received from adjacent neighboring nodes.

Smart meters and data sinks are fixed in terms of geographical locations. Unlike conventional wireless sensor network and mobile ad hoc network, there are only two types of data flows in the smart meter network. The smart meters periodically send data to one or more designated data sinks. Data sinks can send control data to one or more smart meters as needed. The data sinks can be multiple hops away from some smart meters. Therefore, the data from these smart meters must travel over multiple hops before actually reaching the data sink.

The smart meter can possibly aggregate its own data and the data received from several of its neighbors before forwarding the aggregate data to the next hop neighbor, which can be a smart meter or a data sink. The data sinks can include processors and transceivers for processing received data, and sending the aggregate data to the operation centers of utility companies.

Routing is one of key functions in smart meter networks. Routes between smart meters and data sinks must be discovered before data communication can proceed. Routing in a real time smart meter network provides more challenges.

A number of routing methods are known for wireless sensor networks and mobile ad hoc networks based on different requirements, such as ad-hoc on-demand distance vector routing, dynamic source routing, temporally-ordered routing, and routing method for low power and lossy network.

However, conventional routing methods do not suit smart meter network well. Therefore, it is desirable to develop a routing method that satisfies the requirements of smart meter networks.

Routing in Smart Meter Network

In modern utility distribution networks, every smart meter is expected to periodically send its data to the operation center of the utility provider. A meter can also respond to abnormal events, such as a safety and security events by generating asynchronous data traffic. The collected data are then processed, analyzed, and utilized for better demand-response, resource management, and dealing with hazardous situations.

It is imperative that the data be communicated to data sinks in a reliable and efficient manner. Lost or excessively delayed data packets can cause waste of resources or, even worse, endanger human life and property. Therefore, the smart meter network must deploy a well-defined, efficient, and extremely reliable routing methods to satisfy the stringent performance requirements of smart meter network.

Problem with Routing in Smart Meter Network

A number of routing methods for wireless sensor networks and mobile ad-hoc networks are known. The smart meter networks, however, have very distinct requirements based on pronounced architectural differences from general wireless sensor networks, and mobile ad-hoc networks.

In contrast with peer-to-peer communications in wireless sensor networks, the smart meter network has only few data sinks, and almost all the traffic is directed towards the data sinks points. Also, the number of nodes in a smart meter network can run to thousands. Interference could be severe in such a large and dense network. Mobile objects, such as vehicles, can also cause communication link to fail. Data sending interval can be as short as very few minutes. Control data latency can be in seconds.

In peer to peer communications, each pair of communicating nodes generally discovers a route between the nodes. Route discovery in many such networks is done through a network-wide flooding. In a large scale network, communication overhead for route discovery would be huge, especially when many nodes communicate in peer-to-peer fashion. Such an excessive overhead must be avoided in large smart meter networks. Also, meter data and control data must be reliably delivered to destination. Therefore, nodes must have multiple alternate routes already discovered for use when the primary route to a sink point fails.

Furthermore, a node may need to discover routes to multiple data sinks. All these multiple routes must be discovered with minimal communication overhead during the initial discovery or setup phase. A failed route must be repaired without causing network-wide flooding of packets and without disrupting the regular periodic data communications.

One of commonly used routing methods for wireless ad hoc networks is ad-hoc on-demand distance vector (AODV) routing. AODV has its advantages, such as discovering a route only when it is needed and repairing a failed route automatically. However, AODV has excessive transmission of control messages. In AODV routing algorithm, each route discovery between a source node and a destination node causes one network-wide flooding. Route rediscovery takes considerably long time. It is a single path routing method. AODV suits peer-to-peer networks.

Dynamic source routing (DSR) is another routing method commonly used for wireless ad hoc networks. It is similar to AODV in that it forms a route on-demand. However, it does not rely on a routing table. Rather, the sender/source node includes the path to the destination in the packet being transmitted. DSR performs well in small and static networks with low mobility. However, its performance degrades rapidly with mobility increasing. Route maintenance does not repair a failed route. Connection setup delay is higher. Considerable routing overhead is involved due to the route information included in the data packet.

There are two well known routing methods based on directed acyclic graph (DAG). One is the temporally-ordered routing algorithm (TORA), which attempts to achieve a high degree of scalability using a non-hierarchical routing method. TORA constructs and maintains a DAG rooted at a destination. It achieves loop-free multipath routing by only allowing message flowing from nodes with higher heights to nodes with lower heights. TORA is good for dense networks. However, control message overhead in TORA is even higher. As number of nodes increases, control message overhead increases considerably. Also, TORA does not use a shortest path solution.

Routing for low power and lossy network (RPL) is another routing method using the DAG. RPL is under development by the Internet Engineering Task Force (IETF). RPL aims to provide providing reliable and low latency support for large scale smart grid networks. In RPL, each node maintains its position in a DAG structure by using a rank property. However, many important issues are left unresolved by RPL. Rank computation is not described for the RPL. Selection of parents is only based on receipt of a control message from a gateway. If no stable link exists, then this can cause delivery failures. There is no broadcast mechanism in RPL. RPL is tightly related to IPv6, which can cause RPL not suitable for non-IP networks.

Better approach to mobile ad hoc network (BATMAN) is also a routing method for a wireless ad hoc network. The crucial point of BATMAN is the decentralization of knowledge about the best route through the network. No single node has all the data. On a regular basis, each node broadcasts originator message to inform its neighbors about its existence. Neighbors then relay this originator message to their neighbors. In order to find the best way to a certain node, BATMAN counters the originator messages received and records which neighbor the message came in through. BATMAN exhibits high level of stability. However, BATMAN has slow convergence time. Periodic originator messages increases control message overhead, especially for large scale networks such as smart meter networks. Ant agents for hybrid multipath routing (AntHocNet) is an adaptive routing method for wireless ad hoc networks. It is a hybrid method by combining reactive route setup with proactive route probing, maintenance and improvement. AntHocNet discovers multiple paths and continuously searches for new paths. But, route repair takes multiple broadcasts that floods network. Periodic neighbor control messages adds control message overhead, which results in reliability and latency issues in large scale networks.

SUMMARY OF THE INVENTION

The embodiments of the invention provide a method for discovering multiple routes from a data source node to multiple data destination nodes in a large scale multi-hop mesh network. The limited storage capacity and communication bandwidth pose sever restrictions on the nodes for route discovery, and route repair.

In the example network, nodes discover multiple routes to two destinations in the initial discovery phase that includes only two network-wide flooding of packets. The method can also work with one destination. The method can be extended to include more destinations with a proportional increase in the communication overhead. After the completion of the discovery phase, nodes can communicate or forward their own or received data by using any of the available routes.

During the discovery phase, the discovered routes are enumerated based on a cost function, and only the best routes are retained. It ensures that routes have no cycles. The method also facilitates local route repair without disrupting normal data communications being carried on by using alternate routes.

DETAILED DESCRIPTION OF THE PREFERRED EMBODIMENT

Figure 1:
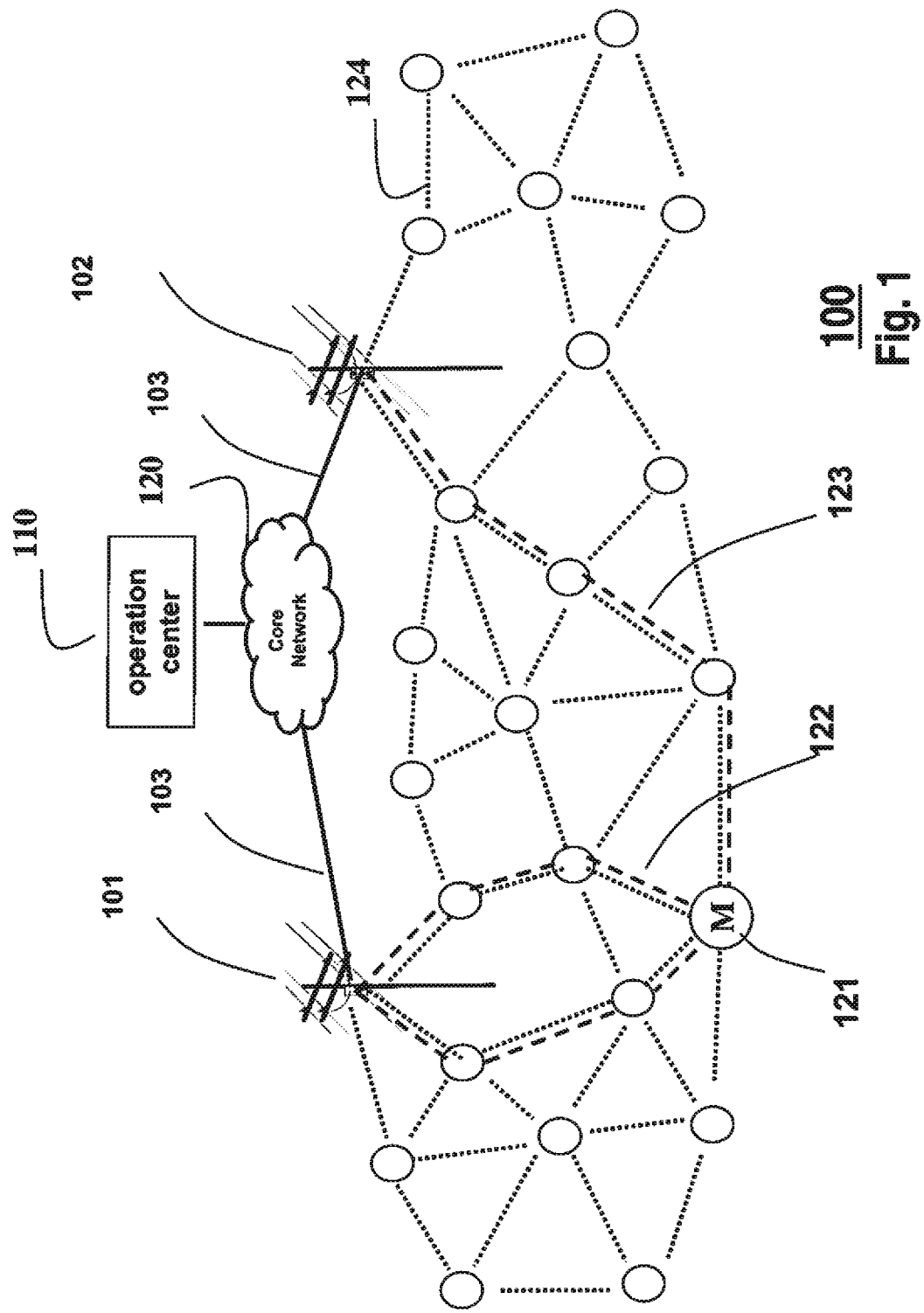
FIG. 1 is a schematic of a smart meter network in which embodiments of the invention operate.

FIG. 1 shows a wireless smart meter network 100 in which embodiments of the invention operate. Primary and backup destination nodes D 101-102 connect to an operation center 110 via a core network 120 via high speed wired or wireless links 103 (solid).

A typical smart meter is a source node S 121, which is connected to the destination nodes with one or more primary routes 122 and one or more backup routes 123 using wireless links 124 (dashed). The destination nodes can be concentrator nodes connected to an operation center of a utility company.

The embodiment of the invention provides a method for discovering routes in the network 100 to one or more destination nodes in an efficient and optimal manner. The communication and storage overhead is minimized and confined only to the initial discovery phase during the process of setting up or recovery of large network.

At the end of route discovery phase, which only uses network-wide broadcasts, all the source nodes in the network have discovered multiple routes to both destination nodes D.

Figure 2:
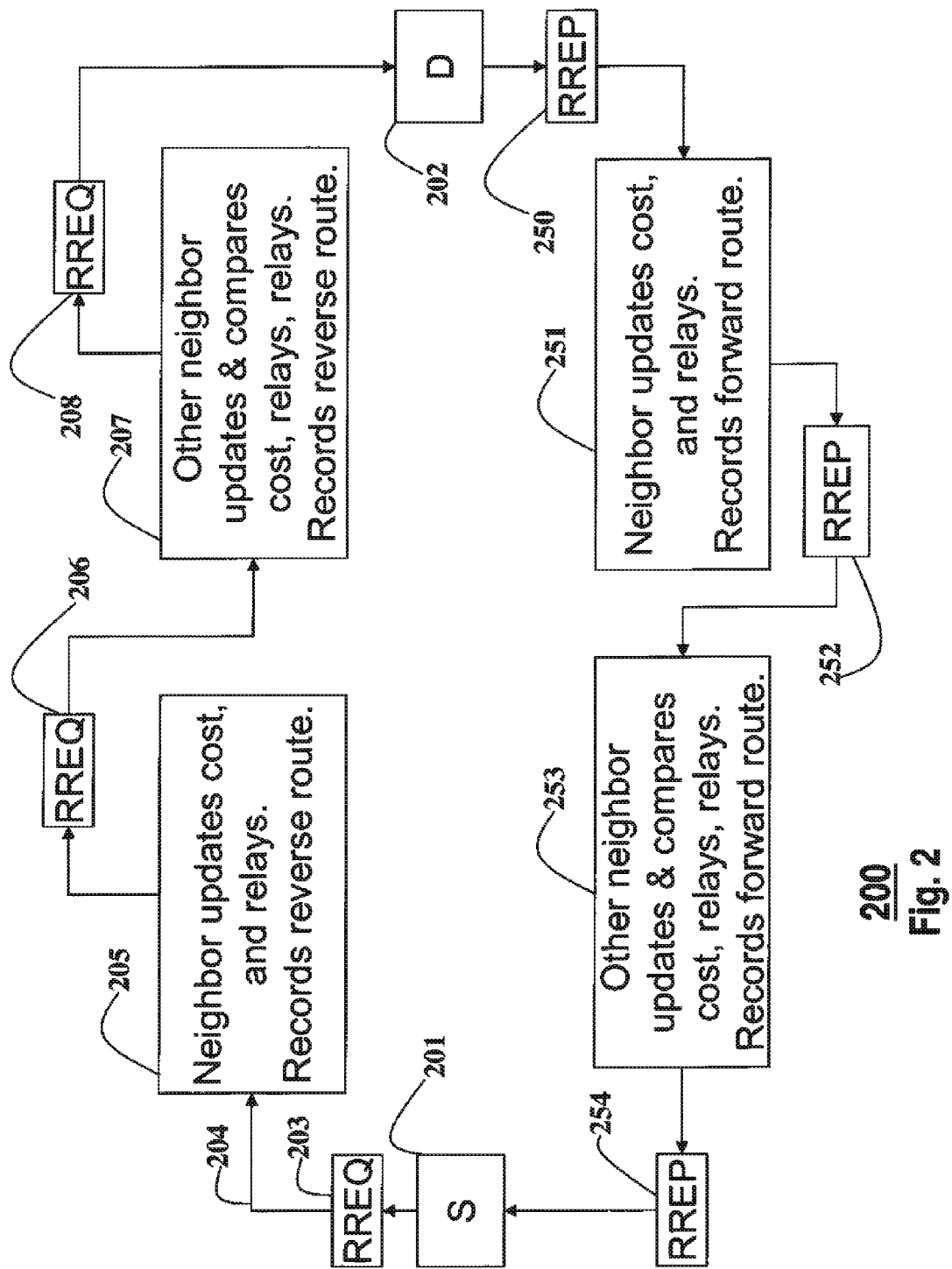
FIG. 2 is a schematic of a method for discovering multiple routes in the network of FIG. 1.

FIG. 2 shows a schematic of a method for discovering multiple routes in the network of FIG. 1. A source node S 201 initiates a route discovery to the destination node D 202 by broadcasting a route request packet RREQ 201. The route discovery can be performed periodically or non-periodically.

Figure 3:
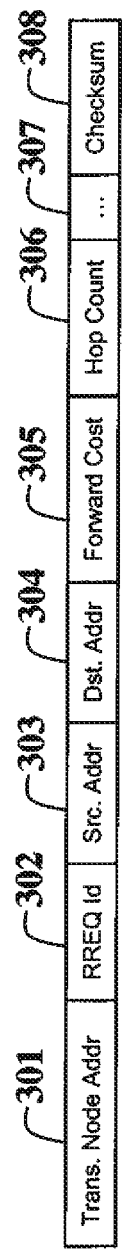
FIG. 3 is a schematic of an example route request (RREQ) packet.

An example format of a RREQ packet is shown in FIG. 3. The RREQ packet includes a transmitting node address 301, a RREQ Id. 302, the source address 303, the destination address 304, the forward cost 305, the hop count 306, and other fields 308-309. However, an actual RREQ packet may have more fields as needed or deemed appropriate for the deployment. This format specifies only the fields that are of interest for this application. Also, the destination node address field 304 in RREQ packet 300 can specify the address of one particular destination node or it may specify all destination nodes (for example, by having the broadcast address 0xFFFF) in the network. Alternately, the destination address field may consist of a list of addresses of a subset of destination nodes in the network.

Every immediate neighbor node 205 of the source node S 201 receives the RREQ 203 packet and checks if the destination node's address 304 for the destination node D 202, in the received RREQ packet, matches to its own address. If the addresses do not match, then the receiving node is not the destination node D 202. In that case, the receiving node acts as an intermediate node 205.

Every intermediate node 205 calculates the forward cost associated with RREQ packet 203 by adding the link cost for the link 204 between the broadcasting node S 201 and receiving node 205 (i.e., itself). This forward cost field 305 indicates if the route back to the node S 201 is viable.

The link cost may be calculated by an appropriate function based on a combination of some or all of the following set of factors: hop count 306, link quality, and average packet drop rate, buffering capacity, and expected transmission delay. This set may not be confined just to the listed factors.

Rather, any other relevant performance parameter may be included in this set. The node then records related information in a local database. The information can include the RREQ Id 302, the source node address 303, which is the address of originating node S 201, of RREQ packet 203, the destination node address, i.e., the address (Trans.Node Addr?) of node D 202, the address 301 of neighbor, i.e., node S 201, that transmitted the RREQ packet, and the updated cost field.

The node re-broadcasts the RREQ packet 206 that contains the updated cost field 305. Every immediate neighbor node 207 of the transmitting node 205 receives the RREQ packet 206. The intermediate node 207 follows the same procedure as done by the intermediate node 205 until the RREQ packet 208 reaches the destination node D 202.

Intermediate nodes 205 and 207 can receive multiple copies of the same RREQ packet 203 from neighboring nodes. Every intermediate node 207 records information of all or only a pre-fixed limited number (i.e., $k \geq 1$) of the RREQ packets it receives for the same REQ Id. The recorded information, in fact, specifies k best routes back to the originating node S 201.

In order to reduce overhead, an intermediate node re-broadcasts the first RREQ packet it receives and any subsequently received copies of the same RREQ packet, i.e. RREQ packets having the same RREQ id, that have lower updated forward cost than that of the RREQ packet that it did previously broadcast.

When the destination node D 202 receives a RREQ packet 208 from its neighboring node 207, it responds by constructing and broadcasting a RREP packet 250.

Figure 4:
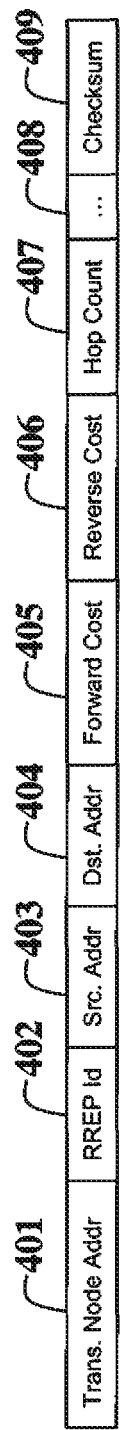
FIG. 4 is a schematic of an example route reply (RREP) packet.

An example format of a RREP packet is shown in FIG. 4. The RREP packet includes a transmitting node address 401, a RREP Id. 402, the source address 403, the destination address 404, the forward cost 405, the reverse cost 406, the hop count 306, and other fields 408-409. However, an actual RREP packet may have more fields as needed or deemed appropriate for the deployment.

The RREP packet 250, constructed and broadcasted by the destination node D 202, may include both the updated forward cost and zero reverse cost. Every intermediate node 251 (and 253) that receives a RREP packet 250 (or 252), updates the reverse cost field 406, by calculates the cost of the receiving link and then adding it to the reverse cost field 406 in the received RREP packet. Like RREQ packets, the intermediate nodes may receive more than one copies of the same RREP packet 250.

Every intermediate node can record related information for all, or up to a pre-fixed number $j, j \leq 1$, RREP packets for the same RREP Id. The recorded information, in fact, specifies j best routes to the destination node D 202. Every intermediate node can easily calculate the cost of each route (from itself to the destination node D 202) by using the value of forward cost field 405 in the received RREP packet by subtracting the stored value of the reverse cost field 306 for the corresponding RREQ packet.

Like the intermediate nodes, the destination node S 202 may receive multiple copies of the same RREQ packet 203 from its neighboring nodes. Similarly, the source node S 201 may receive multiple copies of the same RREP packet 250 from its neighboring nodes. These nodes can record the related information for all or some of the received RREQ and RREP packets, respectively.

Preventing Cyclic Paths

In the method as described in FIG. 2, there is a possibility of routes being discovered having cyclic paths. That can be a problem because any packet that enters a cycle may potentially never leave the cycle. It is therefore imperative to avoid the formation of cycles in the routes being discovered. The problem becomes even more acute in case when every node tries to discover multiple routes to a destination node.

Nodes can prevent formation of these cyclic paths by including extra information in the RREQ/RREP packets. That information can be utilized by the receiving nodes while decided if a received RREQ/RREP packet needs to be discarded. The goal is to make sure that the union of all discovered routes to a destination node forms a logical tree structure.

Every intermediate node discards a RREP packet that may cause violation or falls out of the logical tree structure. To achieve that, every RREQ and RREP packet may contain a list of nodes that it has so far passed through. Every node, while transmitting a RREQ or RREP packet, appends its unique ID (that is, its address) to the list inside the packet. This information is used by the receiving node to decide if it should accept or reject the route (specified by the list in the received packet) to the origin of the packet. That condition will result in non-intersecting routes to the destination node.

Moreover, a node can drop a RREQ or RREP packet if the size of the list reaches to a pre-defined threshold. That will not only help in controlling the packer size, but, rather more importantly, will filter out excessively long routes being discovered. Those long routes will potentially fail to satisfy the stringent latency constraints set for high performance networks.

It is, however, worth noting that non-intersecting route condition will severely restrict the nodes' ability to have multiple optimal routes. Less number of available routes reduces the flexibility of the node to deal with broken routes. It is, in fact, a trade off between the flexibility and degree of non-intersecting routes.

In an extreme case, a node can reject a route to a destination node as specified in just received RREP packet if this route intersects an existing route, discovered previously, to the same destination node. This will force all routes from a given node to the destination node to form non-overlapping paths between that node and the destination node.

It can, therefore, be allowed for the routes to intersect. But the intersection point should be at a safe distance (in terms of number of hops) so that there are plenty of choices for alternate routes if an intersecting node (of multiple routes) breaks down.

Effect of the Invention

The invention is advantageous for a very large smart meter network that must deploy a well-defined, efficient, and extremely reliable routing methods to satisfy the stringent performance requirements of smart meter network. The method is resilient to link and node failures by providing alternate routes from a source to a destination. The method minimizes overhead control messages, which results in reliability and latency issues in large scale networks. The method also avoids cycles in routes.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for discovering multiple routes in a multi-hop network including a set of source nodes and a set of destination nodes such that each source node discovers the multiple routes to all the destination nodes to transmit data from the source node using one of the discovered routes to a particular destination node, comprising the steps of:

broadcasting, by each source node, a route request (RREQ) packet to initiate discovering the multiple routes to the set of destination nodes, wherein the RREQ packet includes routing information and a cost field;

receiving, in neighboring intermediate nodes of the source node, one or more copies of the RREQ packet;

updating, in the neighboring source nodes, the routing information and cost field;

broadcasting, by the neighboring intermediate nodes in response to receiving the one or more copies of the RREQ packet, at least one copy of the RREQ packets to other neighboring intermediate nodes until one or more copies of the RREQ packet are received by the destination nodes;

constructing, in each destination node, a route reply (RREP) packet, for every received RREQ packet, wherein the RREP packet includes routing information and a cost field;

broadcasting, by each destination node to the neighboring, the RREP packet;

receiving, in neighboring intermediate nodes of the destination node, one or more copies of the RREP packet;

updating, in the neighboring intermediate nodes, the routing information and cost field; and broadcasting, by the neighboring intermediate nodes in response to receiving the one or more copies of the RREP packet, at least one copy of the RREP packets to other neighboring intermediate nodes until the one or more copies of the RREP packet are received by each source node so that each source node can select one of the multiple routes to send data to the one of the destination nodes based on die routing information and the cost field in one of the RREP packets.

2. The method of claim 1, wherein the network is flooded with the RREQ packets and the RREP packets for no more than k+1 times, where k is the number of destination nodes.

3. The method of claim 1, wherein the multiple routes are discovered periodically.

4. The method of claim 1, wherein the multiple routes are discovered non-periodically.

5. The method of claim 1, wherein each source node is a meter node, and each destination node is a concentrator node connected to an operating center of a utility provider.

6. The method of claim 1, wherein the nodes are connected by wireless links.

7. The method of claim 1, wherein the multiple routes include one or more primary routes, and one or more backup routes.

8. The method of claim 1, wherein the RREQ packet includes a transmitting node address, a RREQ Id, a source address, a destination address, a reverse cost, a hop count, and the RREP packet includes the transmitting node address, the RREP Id., the source address, the destination address, a forward cost, the reverse cost, and the hop count.

9. The method of claim 8, wherein the forward cost is based on a combination of the hop count, a link quality, an average packet drop rate, a buffering capacity, and an expected transmission delay.

10. The method of claim 1, wherein the intermediate nodes may discard any subsequently received copies of the same RREQ packet.

11. The method of claim 1, further comprising:
eliminating cycles from the multiple routes by a union of the routes to the destination node form a logical tree structure.

12. The method of claim 1, further comprising:
rejecting any route that intersects another route.

13. The method of claim 1, wherein the cost includes a forward cost and a backward cost, and a function of the forward cost and the backward cost determine the cost of a particular route.

14. The method of claim 1, wherein a list of all nodes traversed by the RREQ packets and the RREP packets is stored in each packet.

15. A method for discovering multiple routes in a multi-hop network including a set of source nodes and a set of k destination nodes, comprising the steps of:

broadcasting, by each source node, a route request (RREQ) packet to initiate discovering the multiple routes to the set of k destination nodes;

receiving one or more copies of the RREQ packet in each of the set of k destination nodes;

broadcasting by each of the set of k destination nodes, a route rep (RREP), in response to the receiving; and receiving in each destination node one or more copies of the RREP packet, wherein the network is flooded with the RREQ packets and the RREP packets for no more than k+1 times.

16. The method of claim 15, wherein each RREQ packet and each RREP packet includes one or more routes from the source node to the one or more of the set of k destination nodes and a cost associated with each route; and further comprising:
selecting one of the routes to transmit data to a particular destination node based on the cost.

17. The method of claim 1, wherein routes longer than a predefined threshold are rejected.

18. The method of claim 1, wherein the RREQ packet specifies one destination node as the target of a route discovery or it specifies a set of destination nodes to which routes are discovered simultaneously.

19. The method of claim 1, wherein ever data source node $N_i$ can maintain a local database to keep $R_{i1}>0$ best routes to a destination node $D_1$, $R_{i2}>0$ best mutes to a destination node $D_2$, and so on depending on its available storage capacity and importance of destination nodes, wherein the value of $R_{i1}$ and $R_{i2}$ may or may not be same.

20. The method of claim 1, wherein the source, intermediate and destination nodes are connected by wireless links or any other short range communication technology such as power line communication (PLC) systems.

* * * * *